United States Patent
Yao

(10) Patent No.: US 7,405,554 B2
(45) Date of Patent: Jul. 29, 2008

(54) VEHICLE WHEEL SPEED AND ACCELERATION SENSOR AND METHOD FOR CALCULATING THE SAME

(75) Inventor: MingGao Yao, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 11/512,215

(22) Filed: Aug. 30, 2006

(65) Prior Publication Data
US 2008/0053245 A1 Mar. 6, 2008

(51) Int. Cl.
*G01P 3/42* (2006.01)
*G01B 7/30* (2006.01)

(52) U.S. Cl. .................. 324/160; 324/207.25

(58) Field of Classification Search ............. 73/862.08; 324/160
See application file for complete search history.

(56) References Cited

U.S. PATENT DOCUMENTS

| | | | | |
|---|---|---|---|---|
| 2,554,512 A | * | 5/1951 | Varian | ..................... 73/514.03 |
| 6,133,852 A | * | 10/2000 | Tonkin | ..................... 340/903 |
| 6,619,102 B2 | * | 9/2003 | Salou et al. | ................ 73/11.07 |
| 2002/0006017 A1 | * | 1/2002 | Adelerhof | .................... 360/315 |
| 2003/0090265 A1 | * | 5/2003 | Wan et al. | ............. 324/207.25 |
| 2005/0007105 A1 | * | 1/2005 | Siegle et al. | ........... 324/207.25 |
| 2005/0093539 A1 | * | 5/2005 | Salfelner | ............... 324/207.25 |
| 2005/0283968 A1 | | 12/2005 | Bauer | |
| 2006/0132356 A1 | * | 6/2006 | Dulac | ......................... 342/173 |
| 2006/0202291 A1 | * | 9/2006 | Kolb et al. | ................... 257/421 |

OTHER PUBLICATIONS

John P. Carini, "Circular Motion", Oct. 13, 1999, http://carini.physics.indiana.edu/E105/circular.html.*

* cited by examiner

*Primary Examiner*—Edward Lefkowitz
*Assistant Examiner*—Jonathan Dunlap
(74) *Attorney, Agent, or Firm*—Nixon & Vanderhye P.C.

(57) ABSTRACT

Systems and/or methods for detecting a rotating wheel's speed and/or acceleration are provided. A sensor is attached to the rotating wheel. The sensor includes a circuit (e.g. a Wheatstone bridge circuit) having a plurality of resistors (e.g. 4 resistors). Each resistor includes a giant magnetoresistance (GMR) element and has a resistance changeable based at least in part on a change in magnetic field intensity with respect to an external magnetic field. The sensor generates a signal based at least in part on the resistors' resistances. A processor is operable to calculate the rotating wheel's speed and/or acceleration based at least in part on the signal.

12 Claims, 8 Drawing Sheets

VEHICLE WHEEL SPEED AND ACCELERATION SENSOR AND METHOD FOR CALCULATING THE SAME

FIELD OF THE INVENTION

The example embodiments herein relate to a magnetic sensor unit, and, more particularly, to systems and/or methods for using a magnetic sensor unit to detect speed and/or acceleration of a vehicle wheel.

BACKGROUND OF THE INVENTION

A number of technologies are used in speed sensor devices to determine the rotational speed of various components. For example, in various types of vehicles, speed sensor devices may be used with anti-lock braking systems ("ABS"). One specific speed sensor device is disclosed in application Ser. No. 10/874,838, the entire contents of which are incorporated herein by reference.

Conventionally, magnetic encoder wheels may be installed in motor vehicles. An encoder wheel typically includes an outer surface having magnetized ferrite contained therein. Specifically, the magnetized ferrite is contained in a laminate with alternating north and south poles, and the laminate extends around the circumference of the encoder wheel. The encoder wheel may include features that extend from the surface and project towards a magnetic sensor device. As the wheel rotates, the magnetic sensor may measure the change in the strength of the magnetic field of the alternating poles. From this alternating magnetic field and, in turn, output from the sensor device, the rotational speed of the encoder wheel can be calculated. Such calculations may use, for example, the correlation between the peaks of the sensor's output and the number of the alternating poles around the encoder wheel.

One type of magnetic sensor device for use with speed detection includes a Hall effect transducer. A Hall effect transducer uses a transverse current flow that occurs in the presence of a magnetic field. Applying a direct current (DC) voltage at both ends of the Hall effect transducer creates a longitudinal current flow over its body. With the presence of the magnetic field, a transverse voltage is induced in the Hall effect transducer that can be detected by a second pair of electrodes transverse to the first pair. The potential created in the sensor surface generates a sine wave output with respect to the rotation of the encoder wheel.

FIG. 1A is a schematic view of an example motor vehicle having an encoder for use with a speed sensor, and FIG. 1B shows an enlarged schematic view of a portion of an encoder wheel illustrating the magnetization on the encoder wheel. The encoder wheel 10 is coupled to an axle shaft 20 which rotationally drives a wheel 22. An anti-lock braking system 14 is located on the encoder wheel 10, and it includes a magnetic sensor 16 and a vehicle control module 18. The encoder wheel 10 is magnetized such that it includes a plurality of alternating north and south magnetic poles around its circumference. When the encoder wheel 10 rotates, the magnetic field changes. The magnetic sensor 16 will detect the change in the magnetic field and induce a voltage. The vehicle control module 18 will calculate a speed signal and transfer this information to the anti-lock braking system 14.

Unfortunately, such techniques suffer several drawbacks. For example, it is difficult and expensive to manufacture a system that includes alternating magnetic north and south poles disposed around the circumference of an encoder wheel. Such systems also are complex. Moreover, to control the vehicle, it is necessary to detect the vehicle's rotational speed or acceleration speed, while these techniques only detect the speed of the vehicle.

Thus, it will be appreciated that there is a need for an improved system that does not suffer from one or more of the above-mentioned drawbacks.

SUMMARY OF THE INVENTION

One aspect of an example embodiment relates to a system for detecting a rotating wheel's speed and/or acceleration. Such systems may comprise a sensor unit attached to the rotating wheel. The sensor unit may be constructed in accordance with the principles underlying Wheatstone bridge circuits. The four individual resistors of the bridge circuit may each be formed by one GMR (giant magneto resistance) sensor element, the GMR sensor element changing its resistance based on a change in magnetic field intensity with respect to an external magnetic field. Each of the two GMR elements located in each half bridge may be situated in different magnetic fields, so that a differential mode voltage is generated at the bridge output such that when the wheel rotates, the sensor unit will output a different voltage. A processor may be operable to calculate the rotating wheel's speed and/or acceleration based at least in part on the signal.

Another aspect of an example embodiment relates to a method for calculating a rotating wheel's speed and/or acceleration. Such methods may comprise a sensor with a Wheatstone bridge circuit which is located on the rotating wheel, The Wheatstone bridge circuit may include the four individual resistors of the bridge circuit, each being formed by one GMR element Changes in magnetic field intensities with respect to an external magnetic field. Each of the two GMR elements located in each half bridge may be situated in different magnetic fields, so that a differential mode voltage is generated at the bridge output such that when the wheel rotates, the sensor unit will output a different voltage. Based at least in part on the signal, the rotating wheel's speed and/or acceleration may be calculated.

In certain example embodiments, the circuit may be a Wheatstone bridge circuit, and it may include four resistors. In certain example embodiments, each GMR element may include at least two layers, comprising at least a ferromagnetic layer and a non-magnetic layer. The resistor's change in resistance may be caused by the non-magnetic layer rotating against the ferromagnetic layer. In certain example embodiments, The external magnetic field may be the earth's magnetic field.

In certain example embodiments, the signal may be a waveform with period T, and the sensor may be located at a distance R from the rotating wheel's center. The processor may calculate the rotating wheel's speed according to the formula speed=$2\pi R/T$. In certain example embodiments, the waveform may reflect a speed change $\Delta u$ during a small time period $\Delta t$. The processor may calculate the rotating wheel's acceleration according to the formula acceleration=$\Delta u/\Delta t$.

Certain example embodiments may provide a sensor that can detect both the speed and the acceleration of a vehicle. Such sensors may include, for example, an AMR (anisotropic magnetoresistive effect) sensor element, a TMR (tunneling magnetoresistive effect) sensor element, or a Hall effect sensor element. Certain example embodiments also may provide a sensor that uses the earth's magnetic field without requiring additional magnets, magnetic elements, or magnetization. This simplified structure may reduce the cost of the example embodiments. Certain example sensors may be of a small size, and they may be used to measure the speed and/or the acceleration of a variety of different objects.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1A:
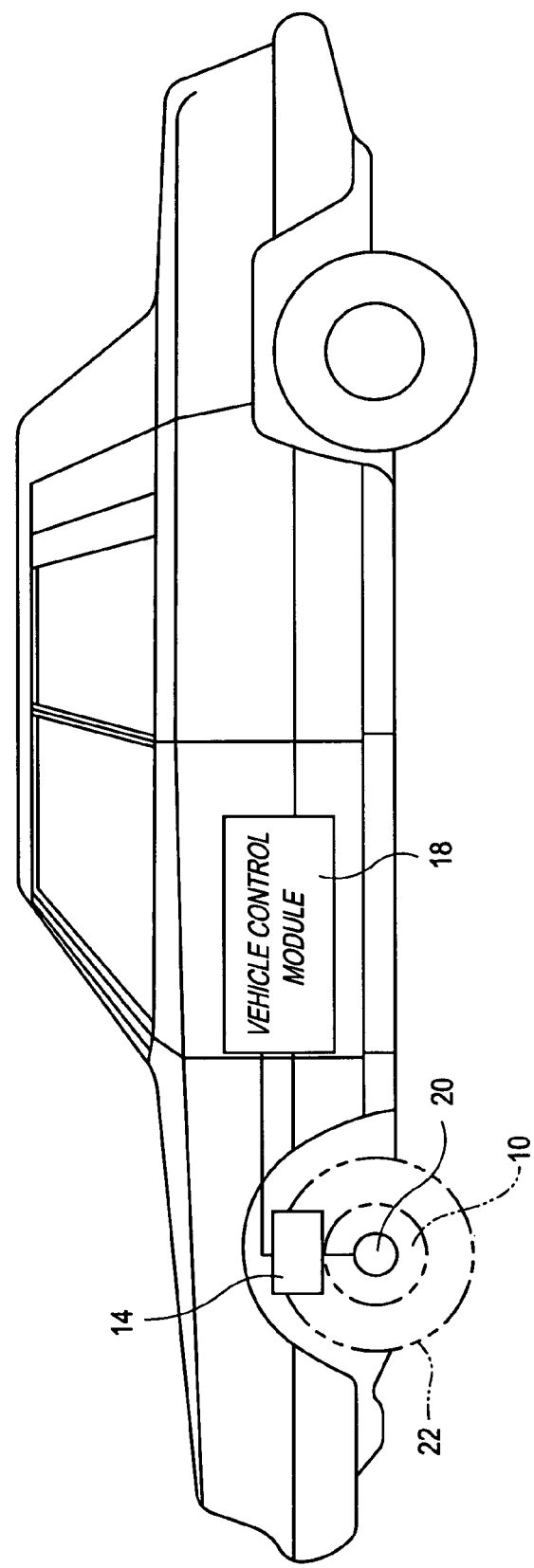
FIG. 1A is a schematic view of an example motor vehicle having an encoder for use with a speed sensor.
Figure 1B:
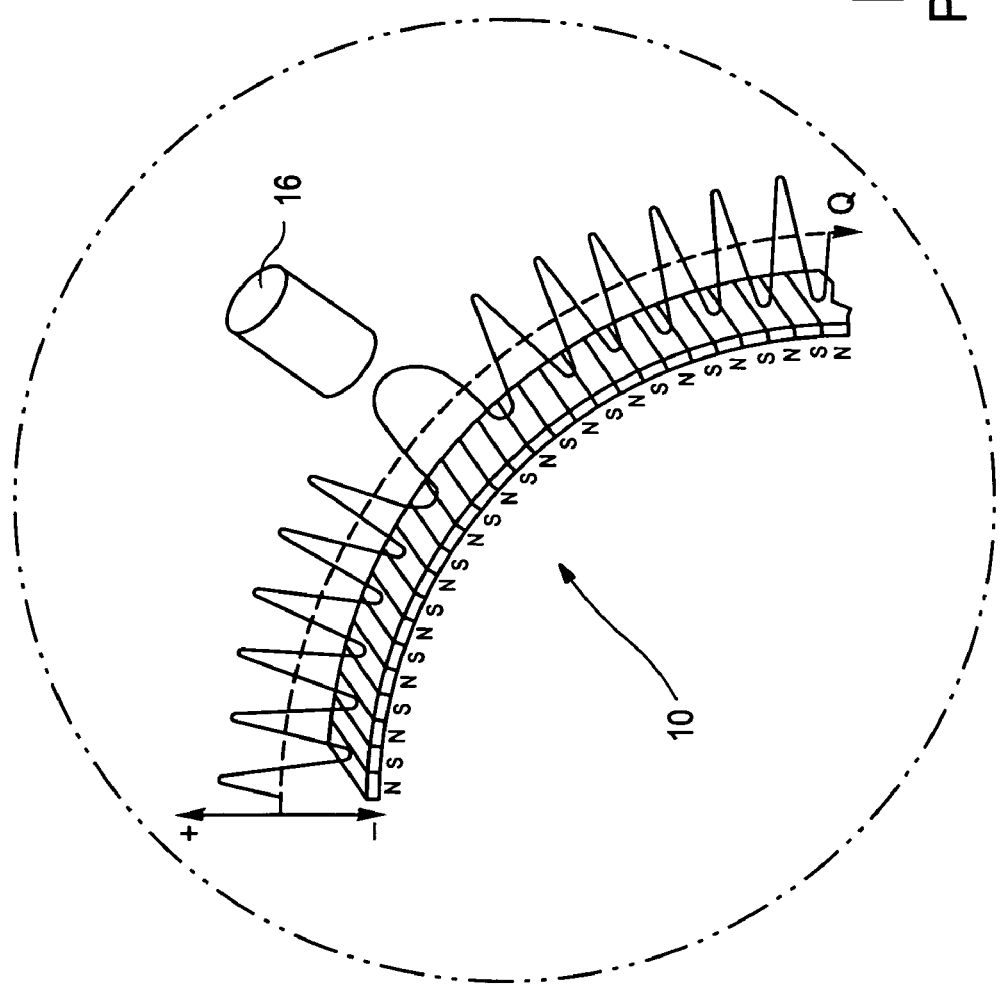
FIG. 1B shows an enlarged schematic view of a portion of an encoder wheel illustrating the magnetization on the encoder wheel.

Certain example embodiments may provide a sensor unit comprising a PCBA (printing circuit board assembly), a Wheatstone bridge circuit, an earth magnetic field detector, and a processor. The four individual resistors of the bridge circuit each may be formed by a giant magnetoresistance (GMR) transducer element. Each GMR element, in turn, may have layers including at least one ferromagnetic layer (e.g. a pin layer) and a non-magnetic thin layer (e.g. a free layer). When an external magnetic field changes, the free layer will rotate against the pin layer which will cause its resistance to change.

A Wheatstone bridge generally is used to measure an unknown electrical resistance by balancing two legs of a bridge circuit. While the Wheatstone bridge circuits in certain example embodiments are used for doubling the differential signal outputs in compare with a signal GMR element, as shown in FIG. 2B, the GMR elements of the Wheatstone bridge circuit in each half of the bridge have the same pin direction, and the GMR elements in the other half bridge have opposite pin directions. Thus, the magnetic field assigned to the each half bridge may induce a maximum differential mode voltage at the bridge output, thus potentially improving the measurement accuracy of the sensor unit.

Magnetoresistance generally refers to the property of some materials to lose or gain electrical resistance when an external magnetic field is applied to them. One specific type of magnetoresistance, the giant magnetoresistance (GMR) effect, is a quantum mechanical effect observed, for example, in thin film structures composed of alternating ferromagnetic and nonmagnetic metal layers. GMR may be reflected as a significant decrease in resistance from the zero-field state when the magnetization of adjacent ferromagnetic layers are anti-parallel because of a weak anti-ferromagnetic coupling between layers, to a lower level of resistance when the magnetization of the adjacent layers align because of an applied external field. The spin of the electrons of the nonmagnetic metal may align parallel or anti-parallel with an applied magnetic field in equal numbers, and therefore may suffer less magnetic scattering when the magnetizations of the ferromagnetic layers are parallel. In certain example embodiments, multilayer GMR, spin-valve GMR, and/or granular GMR may be used. For example, an AMR, TMR or Hall effect sensor element may used instead of the above GMR sensor element in certain example embodiments.

The sensor unit may be located on the vehicle wheel. When the vehicle wheel rotates, the sensor will detect a change relative to the earth's magnetic field based at least in part on the angle between the earth's magnetic field and the pin layer direction of the magnetic sensor element. In certain example embodiments, this effect occurs because the GMR elements of the Wheatstone bridge circuit in each half of the bridge have the same pin direction and the other half bridge has the opposite pin direction. Thus, the magnetic field assigned to the each half bridge may induce a maximum differential mode voltage at the bridge output. The processor may calculate and optionally display the speed and/or the acceleration speed of the object.

Figure 2A:
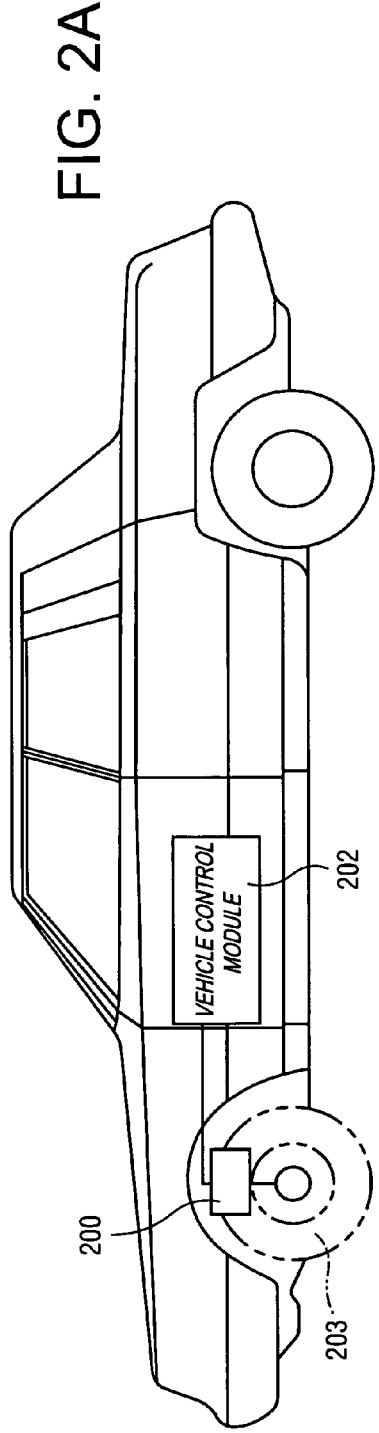
FIG. 2A is a high-level view of an ABS system in accordance with an example embodiment.

Referring now more particularly to the accompanying drawings in which like reference numerals indicate like parts throughout the several views, FIG. 2A is a high-level view of an ABS system in accordance with an example embodiment. The example ABS system shown includes a magnetic sensor unit 200 operable to gather data from encoder wheel 203. A control module 202 may supply power to the sensor unit 200. Additionally, control module 202 may also detect and/or process the differential voltage gathered from the Wheatstone bridge circuit of the sensor unit 200.

FIG. 2B shows an example circuit for use with the Wheatstone bridge circuit of an example magnetic sensor unit. There are four GMR sensor elements A1, A2, A3, and A4 in the Wheatstone bridge circuit. Preferably, the GMR sensor elements in each half of the bridge have the same pin direction with the opposite pin direction in each other half bridge. For example, as indicated by the graphs $pd_1$ and $pd_2$, respectively, GMR sensor elements A1 and A2 have the same pin direction, and GMR sensor elements A3 and A4 have the same pin direction. A1 and A2 have the opposite pin direction compare to A3 and A4. It will be appreciated that this alignment will keep the sensor unit at a maximum differential mode voltage output.

Power is input into the system at a voltage Vcc at the bridge between GMR sensor elements A1 and A4. A ground GND is attached to the system at the bridge between GMR sensor elements A2 and A3. The differential voltage output Vout is taken from the bridges between A1 and A3, and between A2 and A4. However, it will be appreciated that other configurations (e.g. including changes to where to input power, attach a ground, read-out differential voltages, etc.) are possible and contemplated herein.

Figure 2C:
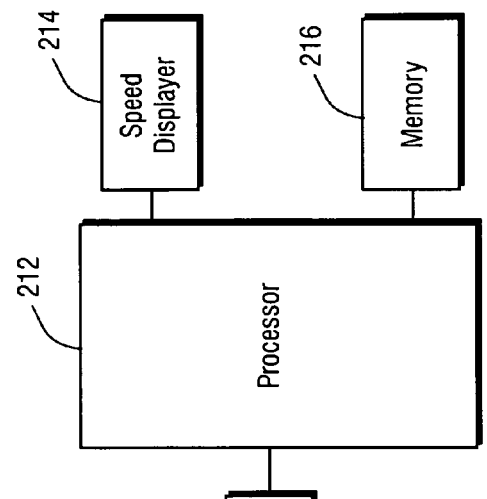
FIG. 2C is a block diagram of a sensor unit in accordance with an example embodiment.
Figure 2B:
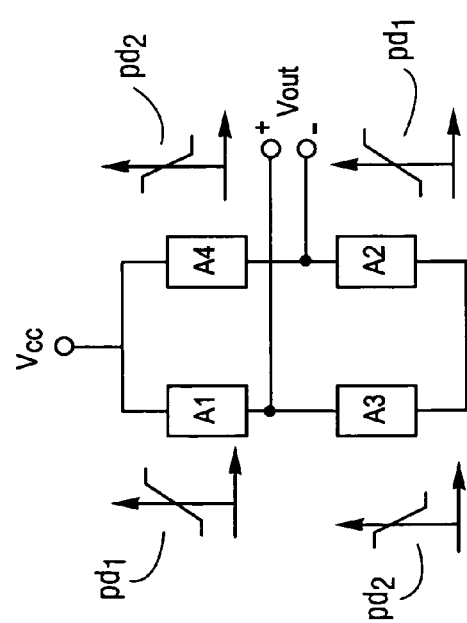
FIG. 2B shows an example circuit for use with the Wheatstone bridge circuit of an example magnetic sensor unit.

FIG. 2C is a block diagram of a sensor unit 200 in accordance with an example embodiment. A sensor 210 may detect magnetic field changes when the wheel 203 rotates and induces a differential voltage (e.g. as a sine wave) from the Wheatstone bridge circuit. This signal from the sensor 210 may be sent to the processor 212. The processor 212, in turn, may calculate the wheel speed and/or the acceleration, and send the resulting information to the speed displayer 214 and/or save the resulting information in the memory 216.

Figure 2D:
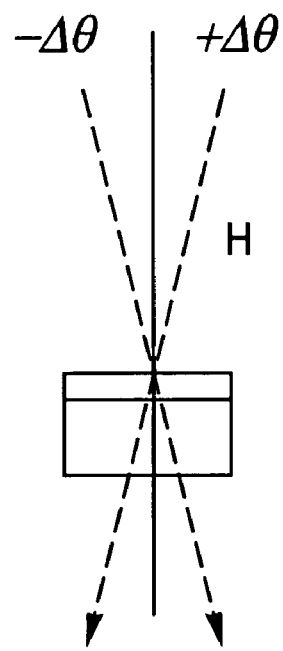
FIGS. 2D and 2E show a relationship between magnetic field intensity, angle, and resistance.
Figure 2E:
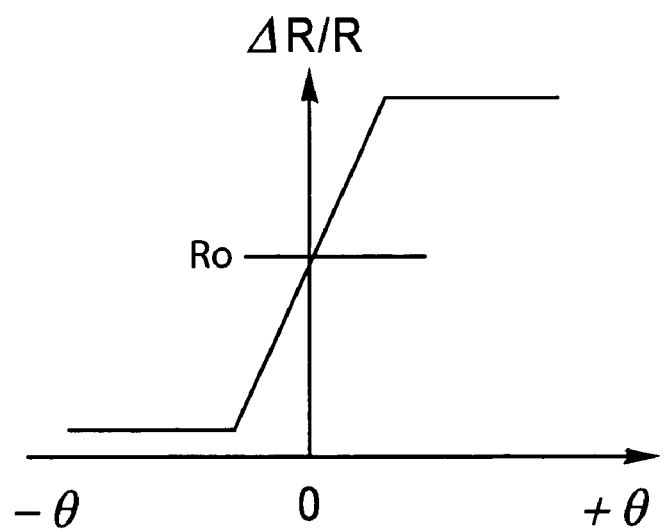

FIGS. 2D and 2E show a relationship between magnetic field intensity, angle, and resistance. When the magnetic field direction varies with the GMR pin direction, the angle is proportional to the GMR element resistance change. This change is equated to a voltage by the Wheatstone bridge circuit. Because the pin direction of the GMR element in each half bridge of the Wheatstone bridge circuit are opposite, when the wheel rotates around, it will induce a voltage (e.g. a sine voltage) between the differential output. For example, as shown in FIG. 2D, as the angle θ increases, the magnetic field intensity also increases (measured here, for illustrative purposes, in amperes per meter, or H). Accordingly, as shown in FIG. 2E, a change in angle θ corresponds to a change in resistance or resistance change ratio (ΔR/R).

Figure 3:
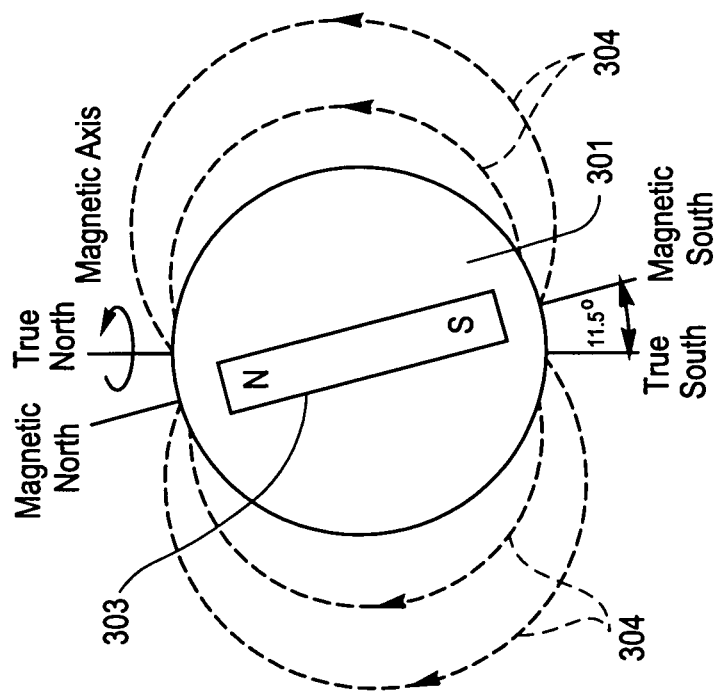
FIG. 3 is a simplified, stylized representation of the earth's magnetic field.

FIG. 3 is a simplified, stylized representation of the earth's magnetic field. FIG. 3 shows true north and south, and magnetic north and south. With respect to FIG. 3, it also will be appreciated that true south and magnetic south are separated by approximately 11.5°, and that the earth 301 rotates about a spin axis as indicated by the curved arrow around true north. The earth 301 has a magnetic field 303 which induces magnetic flux 304 (sometimes also referred to as earth's magnetosphere, which extends into space approximately 70,000 kilometers), emanating from north to south. When the wheel of the vehicle rotates within and/or with respect to the earth's magnetic field, the sensor unit may detect the magnetic field change and generate an output signal based thereon.

Figure 4:
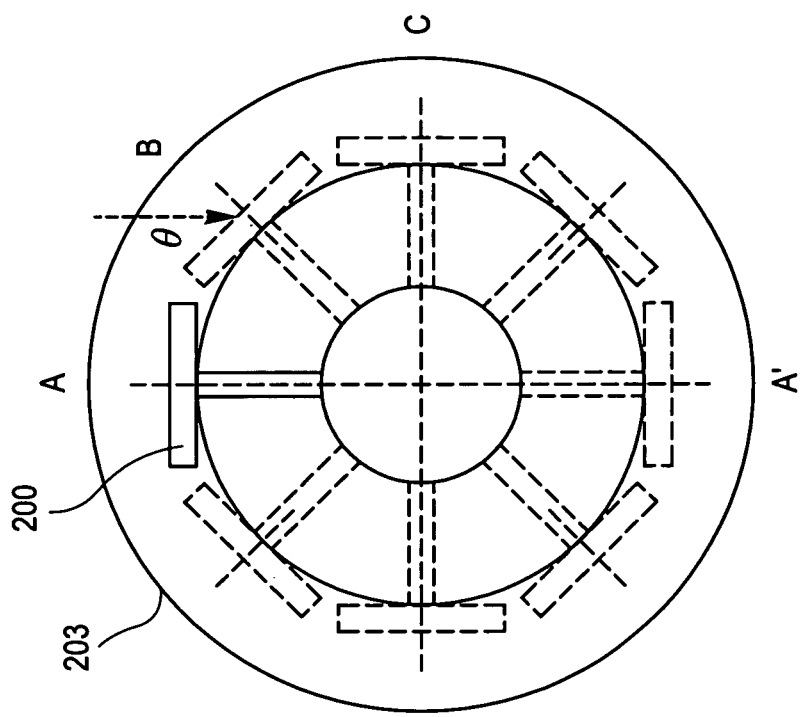
FIG. 4 is a schematic representation of a wheel having a magnetic sensor in accordance with an example embodiment.

FIG. 4 helps explain how a magnetic sensor according to an example embodiment may work. Specifically, FIG. 4 is a schematic representation of a wheel 203 having a magnetic sensor 200 in accordance with an example embodiment. When the wheel is in position A, the earth's magnetic field direction is vertical with respect to the pin layer and free layer directions. Accordingly, the sensor unit generates an output reflecting the largest output, which corresponds to the highest amplitude of a sine waveform (described in greater detail below). When the vehicle wheel rotates, the magnetic field direction and the pin and/or free layer direction will have a certain angle θ with a corresponding output based on a decreasing interaction with the magnetic field. Indeed, the effective magnetic field will decrease until position C is reached, where the effective magnetic field is 0 and the corresponding output also is 0. As the wheel 203 continues to rotate, the effective magnetic field starts to increase, and the highest output will again be reached at position A'. Similarly, when the wheel 203 rotates from position A' back to position A in a clockwise direction, the output of the sensor unit 200 will reflect a sine waveform. It will be appreciated that the locations specified above are for illustrative purposes only, and that the sensor may generate signals at any sampling rate (though generally a higher sampling rate will yield more fine results). For example, in accordance with an example embodiment, the sampling rate may be every 5 ms. It also will be appreciated that the sensor location on the wheel may be varied in certain example embodiments, and the corresponding output may need to be shifted (e.g. phase shifted) accordingly.

Figure 5:
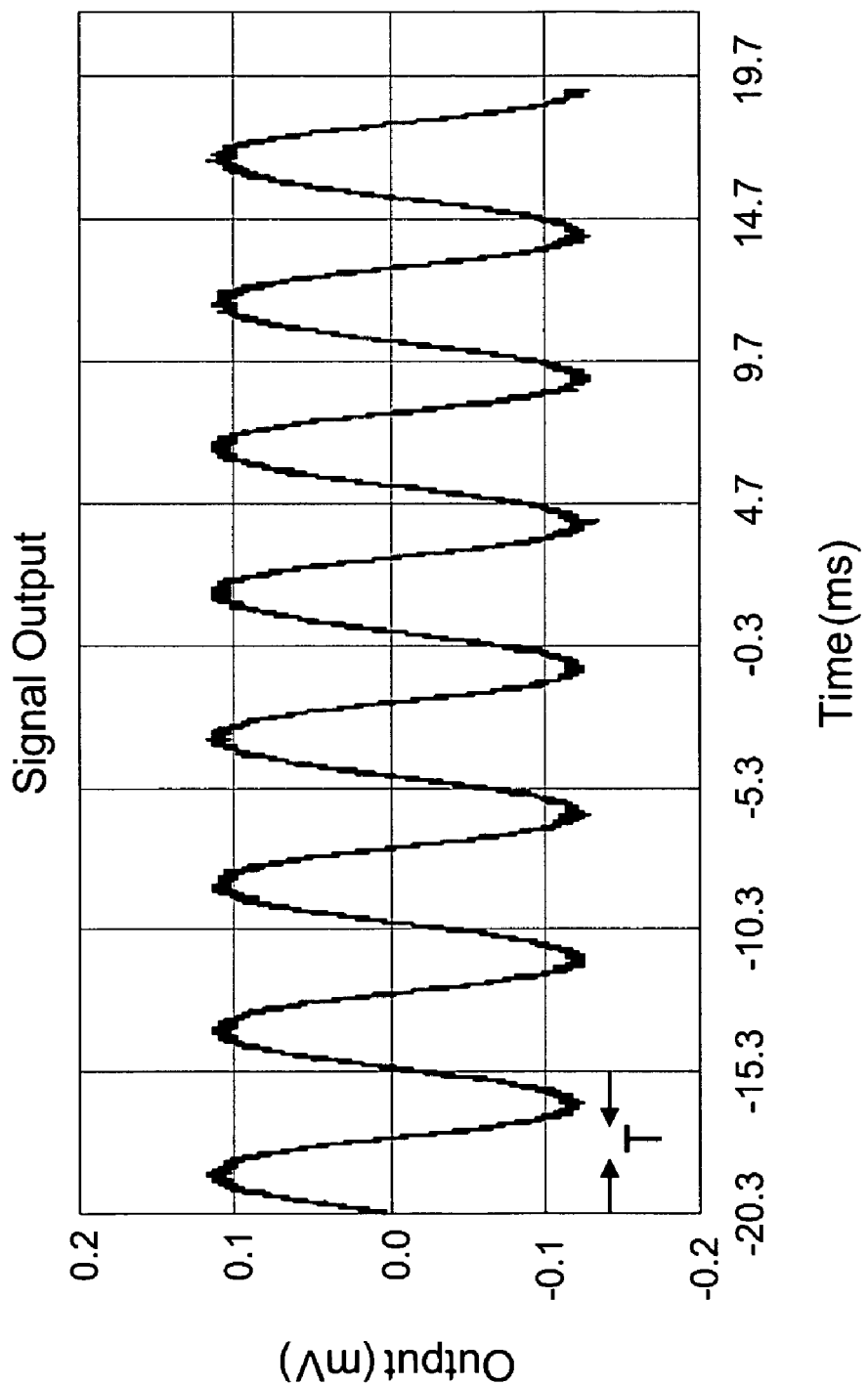
FIG. 5 is an illustrative graph based on the output from an example sensor unit, and is used to show one method for calculating wheel speeding in accordance with an example embodiment.

FIG. 5 is an illustrative graph based on the output from an example sensor unit, and is used to show one method for calculating wheel speeding in accordance with an example embodiment. As described above, the sensor unit generates a sine output when the sensor unit rotates with the wheel. From the sine output, the period T of the sine waveform can be observed. Also, the sensor location radius R (e.g. with respect to the vehicle wheel) is known when the sensor unit is installed. The speed of the vehicle wheel is equal to 2 πR/T, which may be calculated by the processor of the sensor unit. It will be appreciated that the processor may perform error checking.

Figure 6:
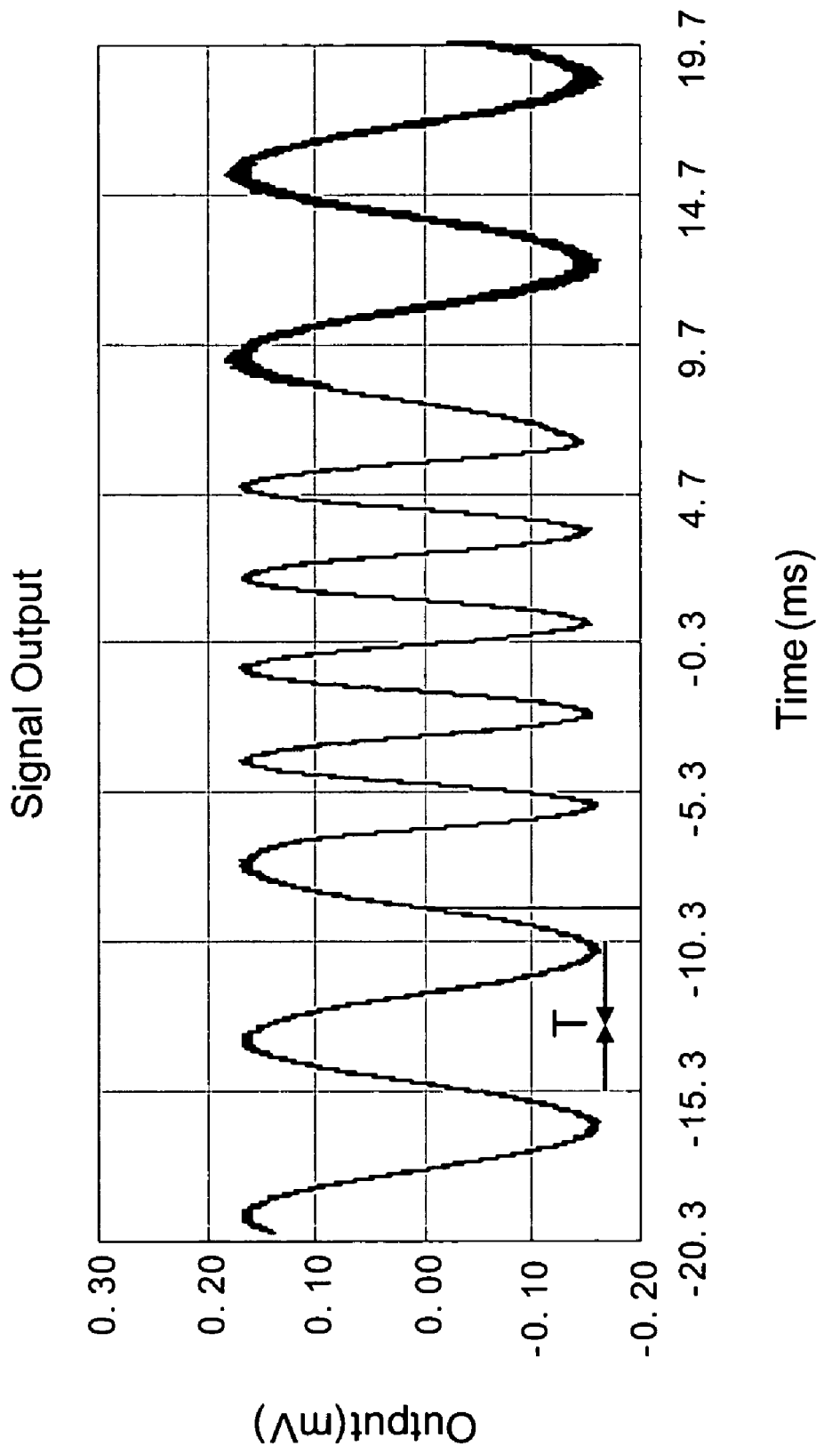
FIG. 6 is an illustrative graph based on the output from an example sensor unit, and is used to show one method for calculating wheel acceleration speed in accordance with an example embodiment; and, FIG. 7 is an example flowchart showing a method for calculating a rotating wheel's speed and or acceleration.

FIG. 6 is an illustrative graph based on the output from a example sensor unit, and is used to show one method for calculating wheel acceleration speed in accordance with an example embodiment. As described above, the sensor unit generates a sine output when the sensor unit rotates with the wheel. From the sine output, the period T of the sine waveform can be observed. Also, the speed change Δu within a short time period Δt can be calculated. The acceleration speed will be equal to Δu divided by Δt. It will be appreciated that the processor may perform error checking.

Figure 7:
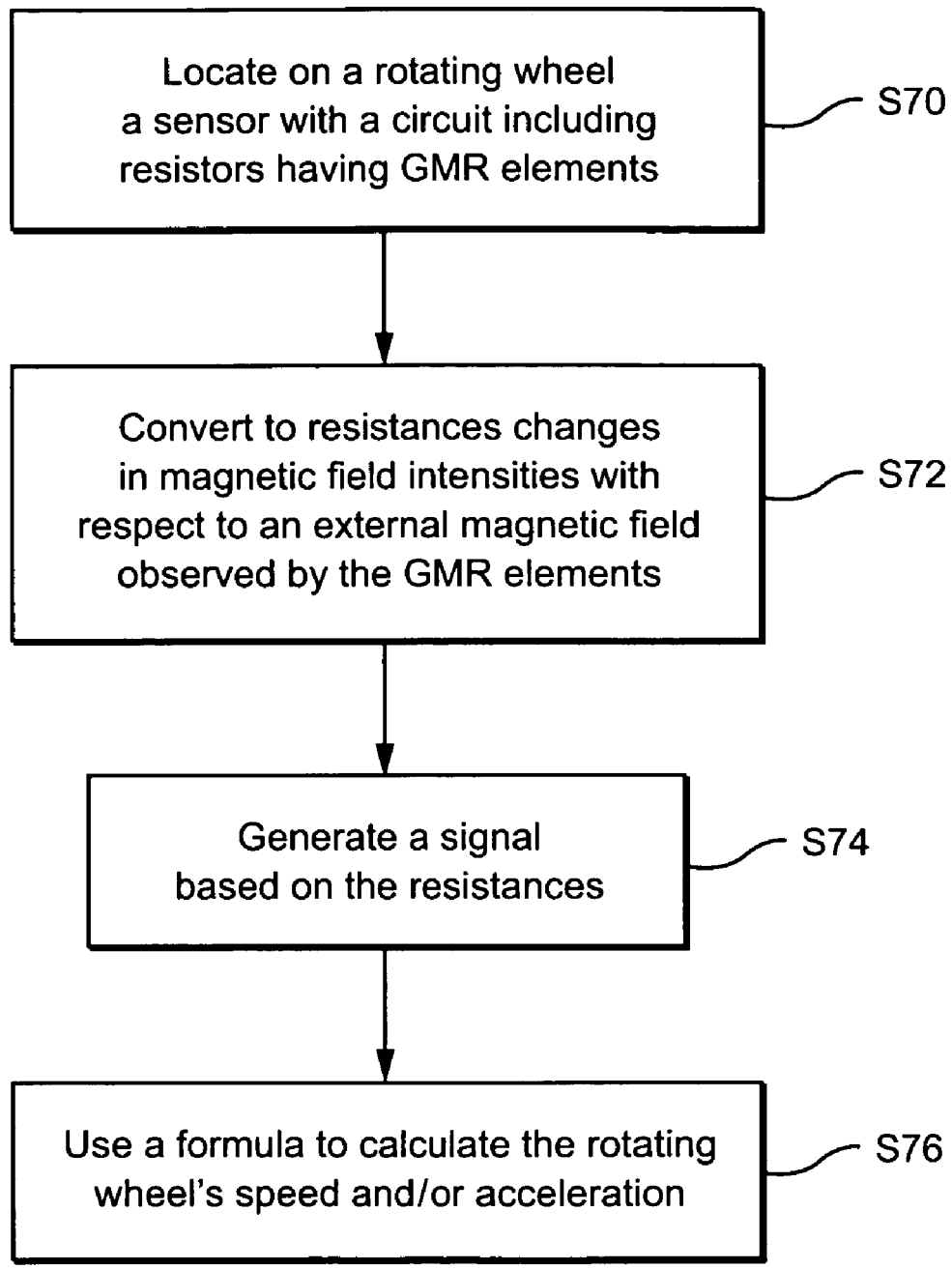

FIG. 7 is an example flowchart showing a method for calculating a rotating wheel's speed and or acceleration. In step S70, a sensor with a circuit including resistors having GMR elements is located on the rotating wheel. Changes in magnetic field intensities observed by the GMR elements with respect to an external magnetic field are converted to resistances in step S72. A signal based on these resistances is generated in step S74. Finally, in step S76, a formula (e.g. as specified above) may be used to calculate the rotating wheel's speed and/or acceleration. In certain example embodiments, AMR, TMR or Hall effect sensor elements may be used for the speed and or acceleration detection.

Although the example embodiments are explained with reference to a vehicle having ABS, it will be appreciated that these techniques may be implemented in any vehicle (e.g. an automobile, bus, motorcycle, bicycle, etc.) for any number of purposes. For example, these techniques may be used to measure speed and/or acceleration to provide an additional or alternate readout for a driver. These techniques also may be used in driver-assist systems, which may, for example, dynamically alter the speed of the vehicle for the driver. Moreover, the present invention has applications beyond vehicles. Indeed, the example embodiments disclosed herein may be used with, modified for, or adapted to any object having a wheel, such as, for example, a hard disk drive, and report on the speed and/or acceleration thereof.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A system for detecting a rotating wheel's speed and/or acceleration, comprising:
   a sensor attached to the rotating wheel, the sensor including
      a circuit having a plurality of resistors, each resistor having a resistance changeable based at least in part on a change in magnetic field intensity with respect to an external magnetic field which is substantially independent of any magnetic field generated by the rotating wheel or any elements collocated with the rotating wheel, the sensor being operable to generate a signal based at least in part on the resistors' resistances; and,
   a processor, operable to calculate the rotating wheel's speed and/or acceleration based at least in part on the signal,
   wherein the sensor is configured to operate substantially independent of any magnetic auxiliary fields, and wherein the external magnetic field is the earth's magnetic field.

2. The system of claim 1, wherein each resistor includes at least one giant magneto-resistance (GMR) element.

3. The system of claim 1, wherein the circuit is a Wheatstone bridge circuit.

4. The system of claim 2, wherein each GMR element includes at least two layers, comprising at least a ferromagnetic layer and a non-magnetic layer.

5. The system of claim 1, wherein each resistor includes at least one of an anisotropic magneto-resistive effect (AMR) element, a tunneling magneto-resistive effect (TMR) element, or a Hall effect element.

6. The system of claim 1, wherein the signal is a waveform with period T, the sensor is located at a distance R from the rotating wheel's center, and the processor calculates the rotating wheel's speed according to a formula, the formula being $2\pi R/T$.

7. The system of claim 1, wherein the signal is a waveform that reflects a speed change $\Delta u$ during a small time period $\Delta t$, and further wherein the processor calculates the rotating wheel's acceleration according to a formula, the formula being $\Delta u/\Delta t$.

8. A method for calculating a rotating wheel's speed and/or acceleration, the method comprising:

locating on the rotating wheel a sensor with a circuit including a plurality of resistors, each resistor having a resistance changeable based at least in part on a chance in magnetic field intensity;

converting to resistances changes in magnetic field intensities with respect to an external magnetic field which is substantially independent of any magnetic field generated by the rotating wheel or any elements collocated with the rotating wheel as indicated at least in part by elements in the resistors;

generating a signal based on the resistances; and, calculating the rotating wheel's speed and/or acceleration based at least in part on the signal, wherein the sensor is configured to operate substantially independent of any magnetic auxiliary fields, and wherein the external magnetic field is the earth's magnetic field.

9. The method of claim 8, wherein each resistor includes at least one of a giant magnetoresistance (GMR) element, an anisotropic magnetoresistive effect (AMR) element, a tunneling magnetoresistive effect (TMR) element, or a Hall effect element.

10. The method of claim 8, wherein the circuit is a Wheatstone bridge circuit.

11. The method of claim 8, wherein the signal is a waveform with period T, the sensor is located at a distance R from the rotating wheel's center, and calculation of speed is performed according to a formula, the formula being $2\pi R/T$.

12. The method of claim 8, wherein the signal is a waveform that reflects a speed change $\Delta u$ during a small time period $\Delta t$, and further wherein the calculation of acceleration is performed according to a formula, the formula being $\Delta u/\Delta t$.

* * * * *